United States Patent [19]

Kurosawa et al.

[11] Patent Number: 4,854,477

[45] Date of Patent: Aug. 8, 1989

[54] CONTROL DEVICE FOR A VENDING MACHINE DISPENSING MECHANISM

[75] Inventors: Akihito Kurosawa; Kazuyuki Suzuki; Osamu Anazawa; Masayuki Yoshihara, all of Gunma, Japan

[73] Assignee: Sanden Corporation, Gunma, Japan

[21] Appl. No.: 129,408

[22] Filed: Nov. 25, 1987

Related U.S. Application Data

[63] Continuation of Ser. No. 875,108, Jun. 17, 1986, abandoned.

[30] Foreign Application Priority Data

Jun. 17, 1985 [JP] Japan .............................. 60-90026[U]

[51] Int. Cl.$^4$ ......................... G07F 11/10; B65G 59/06

[52] U.S. Cl. ........................................... 221/1; 221/13; 221/116

[58] Field of Search ................... 221/13, 21, 116, 129, 221/1; 194/200

[56] References Cited

U.S. PATENT DOCUMENTS

| | | | |
|---|---|---|---|
| 3,409,116 | 11/1968 | O'Malley | 221/21 X |
| 3,795,343 | 3/1974 | Shigemori et al. | 221/21 X |
| 3,998,357 | 12/1976 | Levasseur | 221/21 |
| 4,542,834 | 9/1985 | Kurosawa et al. | 221/116 |

*Primary Examiner*—F. J. Bartuska

*Attorney, Agent, or Firm*—Banner, Birch, McKie & Beckett

[57] ABSTRACT

A control device for a dispense mechanism is provided for eliminating failure of the dispense mechanism due to goods becoming stuck therein. In a dispense mechanism of the type wherein a rotating control plate is provided for restricting the motion of dispensing flappers, a control device is provided for controlling the operation of a motor which rotates the control plate. The control device provides a forward rotation signal to rotate the control plate and dispense goods in response to a dispense request. The control device further determines whether an article has become stuck by determining whether the flappers return to their original position while the control plate is being rotated. If an article is struck, the control device rotates the motor in the reverse direction such that the stuck article may be freed. Thereafter, the control device is rotated in a forward direction and again the determination is made whether the flappers have moved to their original position. This operation is repeated until either the flappers move to their original position or the motor is reversed a predetermined number of times, at which time the operation of the dispense mechanism is terminated.

11 Claims, 11 Drawing Sheets

TRUTH TABLE FOR DECODER 304

| INPUTS | | OUTPUTS | |
|---|---|---|---|
| A | B | $Q_3$ | $Q_1$ |
| 0 | 0 | 0 | 0 |
| 0 | 1 | 0 | 0 |
| 1 | 0 | 0 | 1 |
| 1 | 1 | 1 | 0 |

CONTROL DEVICE FOR A VENDING MACHINE DISPENSING MECHANISM

This application is a continuation of application Ser. No. 875,108, filed June 17, 1986 now abandoned.

BACKGROUND OF THE INVENTION

This invention relates to the field of vending machines and, more particularly, to an improved control device for the dispensing mechanism in a vending machine.

Various types of dispensing mechanisms for vending machines have been used in the prior art depending on the type of food products or goods being vended. One well known type of dispensing mechanism uses a flapper device to dispense rectangular or cube shaped paper cartons containing a beverage or other liquid.

The basic construction of a flapper type dispensing mechanism is shown in commonly assigned U.S. Pat. No. 4,542,834, the disclosure of which is incorporated herein, in its entirety, by the foregoing reference thereto. This type of dispensing mechanism includes a rotating shaft which extends vertically into the storage area of the vending machine to divide the storage area into two vertical rows or columns stacked with vending articles. A control plate is fixed on the lower end of the rotating shaft and controls the operation of a pair of flappers positioned below the two vertical rows of articles. As the flappers open and close upon rotation of the shaft, the lowermost articles in the rows are dispensed.

During the dispensing operation, the articles stacked above the lowermost article are held in position by a holding apparatus. The holding apparatus may be connected to the rotating shaft and be automatically positioned by the shaft to hold the upper articles in place, e.g., by pressing the articles against the interior of the vertical rows. Operation of the holding apparatus is, therefore, quite likely to result in some deformation of the outer shape of the articles. As a result of the deformation, smooth operation of the dispensing mechanism will be impaired. Moreover, the time for completely dispensing an article from the dispensing mechanism will also increase. Also, the rotating shaft is usually operated by a motor which is controlled by a timer device. Thus, if the dispensing operation takes too much time, the shaft will begin turning before the dispensed article has cleared the flapper into the discharge opening. As a result, the dispensing mechanism is likely to become jammed.

Further prior art dispensing mechanisms are usually provided with a protecting circuit which turns the motor off after a predetermined time period has passed. Though the motor is protected from damage by the protective circuit, the vending machine remains inoperative even when articles are still stored within the storage area.

SUMMARY OF THE INVENTION

It is, therefore, a primary object of the invention to provide a simple dispensing mechanism for a vending machine, which mechanism prevents articles from becoming stuck.

It is another object of this invention to provide a dispensing mechanism for a vending machine which dispenses articles free from the adverse effects due to deformation of the articles.

It is a further object of this invention to provide an improved dispensing mechanism which may be readily utilized with conventional dispensing machines.

A dispensing mechanism for vending machines according to this invention includes an article storage area for storing articles in a stacked position above a bottom opening through which one or more articles are dispensed. The dispensing mechanism includes a pair of flappers which are rotatably supported at the lower end of the storage area. A control plate is attached on the lower end of the motor driven rotating shaft and contacts the back surface of the flappers to control the pivoting of the flappers upon rotation of the rotating shaft. A motor control device starts the motor after receiving a start signal and continues to drive the motor for a predetermined time period. The motor control device also reverses the rotation of the motor when the rotating shaft is not returned to its predetermined position after termination of the predetermined time period.

Further objects, features and other aspects of this invention will be understood from the following detailed description of the preferred embodiment with reference to the annexed drawings.

DETAILED DESCRIPTION OF THE PREFERRED EMBODIMENT

Figure 1:
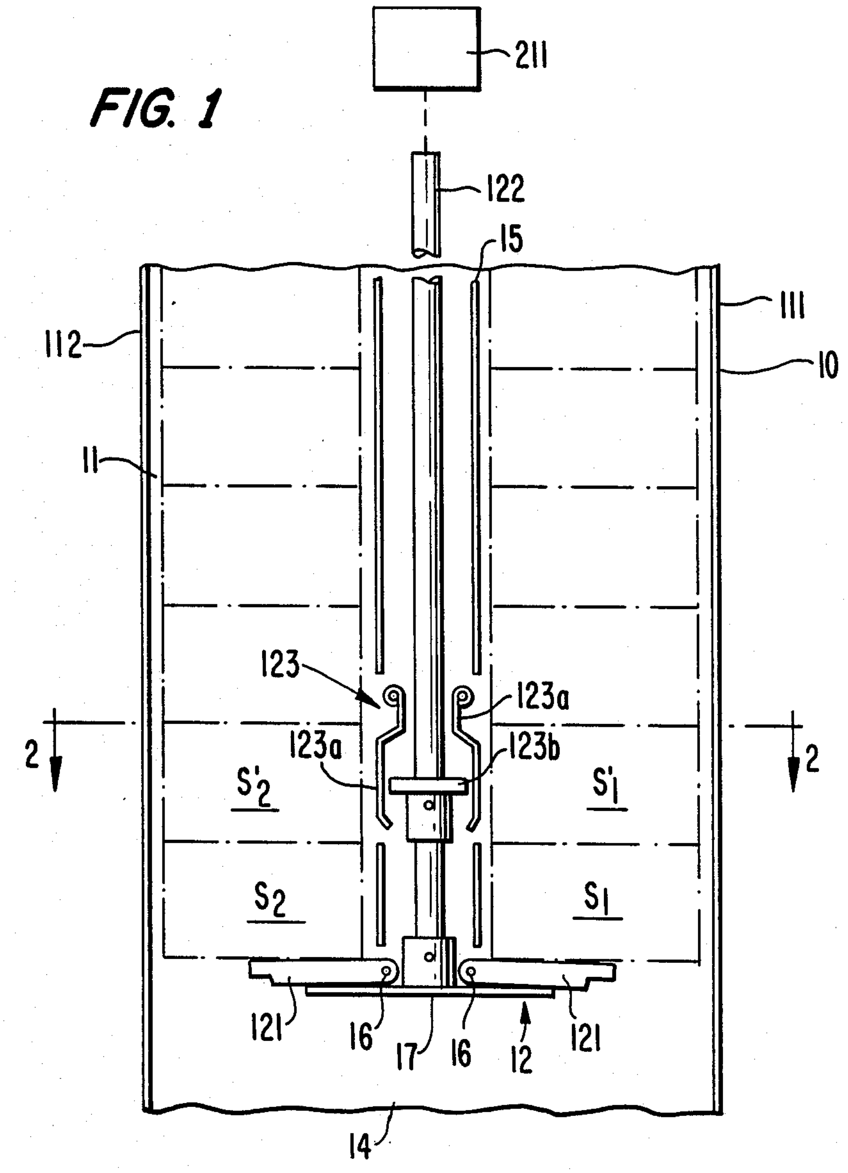
FIG. 1 is a partial front view of an article dispensing mechanism according to the invention.
Figure 2:
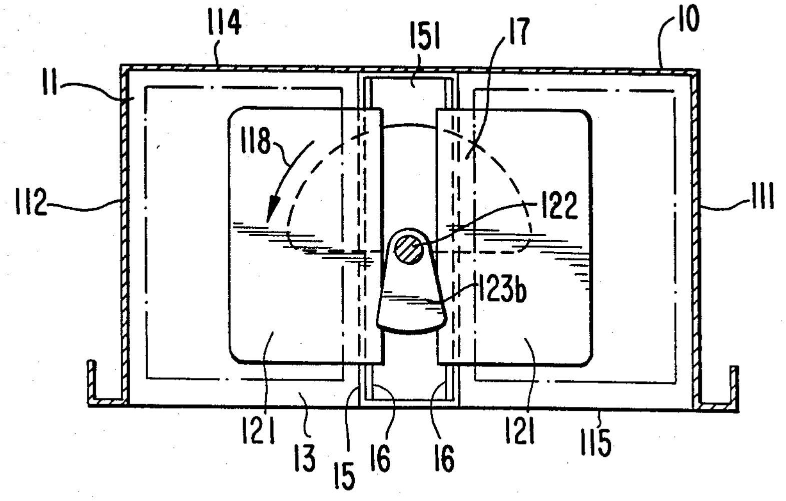
FIG. 2 is a sectional view taken long line 2—2 in FIG. 1.

Referring to FIGS. 1 and 2, a dispensing unit 10, including a motor control device in accordance with the present invention, is shown. The dispensing unit 10 includes article storage area 11 and article dispensing mechanism 12. Article storage area 11 comprises vertical side plates 111 and 112, an upper plate (not shown) and a back plate 114 connected to form a U-shaped cross-section as shown in FIG. 2. Front support plate 115 is connected across the lower front portion of side plates 111 and 112. Front opening 13, which is formed between side plates 111 and 112, the upper plate (not shown) and support plate 115, is used to load articles into storage area 11. Storage area 11 has a bottom discharge opening 14 through which articles are dispensed. Storage area 11 is also divided into two vertical columns by divider plate 15 which extends vertically through the center portion of storage area 11 and has a rectangular-shaped, cross sectional space 151. Articles S are stored in the columns formed on both sides of divider plate 15.

Article dispensing mechanism 12 is disposed within article storage area 11 and comprises a pair of rectangularly shaped flappers 121, rotating shaft 122, holding apparatus 123 and a driving mechanism 211. Flappers 121 are pivotably supported by a hinge element 16 which is removably disposed on front plate 115 and back plate 114 below divider plate 15. As shown in FIG. 1, flappers 121 are disposed in discharge opening 14 of storage area 11, i.e., flappers 121 are positioned below each of the columns formed by divider plate 15 to control the opening and closing of discharge opening 14.

Rotating shaft 122 extends vertically into space 151 of divider plate 15. The lower end portion of rotating shaft 122 is rotatably supported by a support element (not shown) which is fixed to and extends from the inner surface of back plate 114. The upper end portion of rotating shaft 122 is connected to a driving mechanism 211 which is disposed on the upper plate and includes a motor and a control device for driving rotating shaft 122.

Rotating shaft 122 has an arc shaped control plate 17 at its lower end portion. Control plate 17 contacts the lower or back surface of flappers 121. When control plate 17 is in its support position, i.e., is in engagement with the lower surface of both flappers 121, the flappers are forced in a horizontal position. Thus, control plate 17 controls the pivoting of flappers 121 to prevent discharge of any articles from storage area 11. When control plate 17 is rotated by the operation of rotating shaft 122 to contact only one of flappers 121, the other flapper pivots to an open position to permit discharge of an article from the column associated with the pivoting flapper (see FIG. 3).

Holding apparatus 123, which comprises a pair of levers **123*a*, is pivotally supported within space 151 of divider plate 15. An arc shaped pushing element 123*b* is disposed in article storage area 11 at a position adjacent the lower portion of driving shaft 122. Pushing element 123*b* is attached to, and rotated by, rotating shaft 122. As shown in FIG. 2, holding apparatus 123 is aligned with articles S1′ and S2′, which articles are stacked above lowermost articles S1 and S2. As shaft 122 rotates, one of levers 123*a* is pushed against an article S1′ of S2′ (FIG. 3) by the rotation of pushing element 123*b*. Thus, article S1′ or S2′, stacked above article S1 or S2, can be held in position by the operation of holding apparatus 123**.

Referring to FIGS. 1–6, the operation of the article dispensing mechanism will be described. Articles or packages S containing beverages or other merchandise are loaded within storage area 11 through front opening 13. These articles are stacked on flappers 121 to form two vertical columns. When motor 21 is energized by a signal from the vending switch, rotating shaft 122, holding apparatus 123 and control plate 16 are rotated. (The direction of rotation is shown by arrow 118 in FIG. 2.)

During the rotation of rotating shaft 122, the outer terminal end of pushing element **123*b* comes into contact with one of levers 123*a*, thereby pushing the lever into engagement with article S1′. Article S1′ is therefore maintained between the lever and side plate 111. Just prior to control plate 16 being rotated away from its contact position with both flappers 121 to a position in contact with only one of the flappers, i.e., prior to the time when rotating shaft 122 has rotated about 90° from its initial position, article S1′, which is stacked above lowermost article S1, is frictionally and securely engaged between one of levers 123*a* of holding apparatus 123 and side plate 111. Thus the article above lowermost article S1 on flapper 121** is held in its stacked position.

Figure 3:
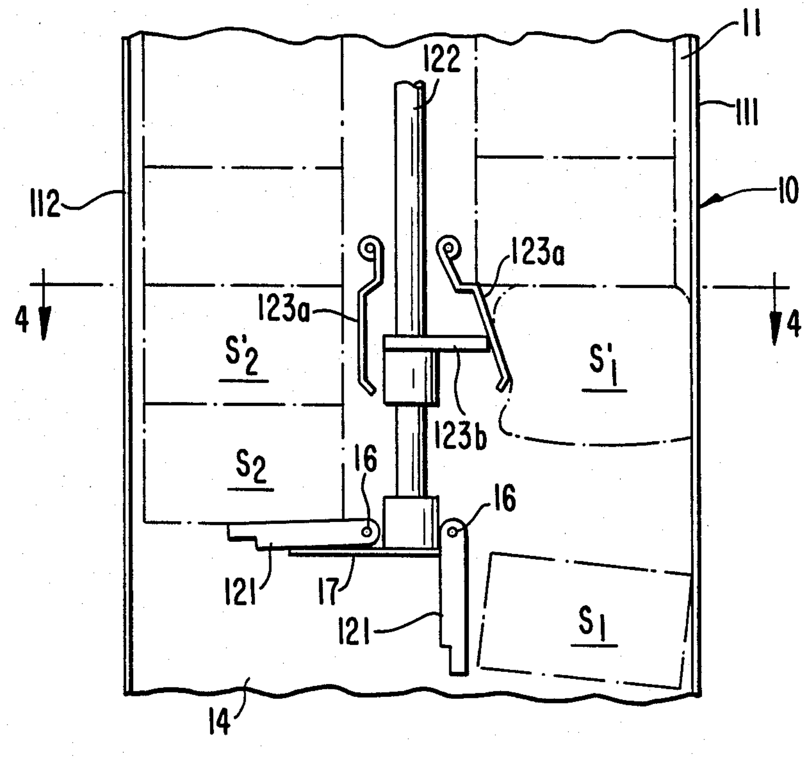
FIG. 3 is a partial front view of the article dispensing mechanism of FIG. 1 illustrating its dispensing operation.
Figure 4:
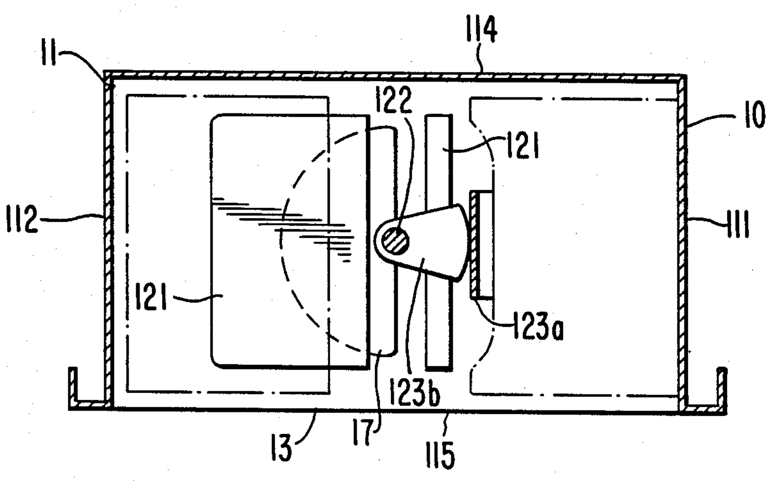
FIG. 4 is a sectional view taken along line 4—4 in FIG. 3.

When rotating shaft 122 is rotated more than 90° from its support position, one of flappers 121 is released from its horizontal position and this one flapper pivots downward around hinge element 16. Then article S1, which is disposed on this one released flapper, is allowed to drop to the vending area (FIGS. 3 and 4). At the same time, the other flapper 121 is maintained in its horizontal position by control plate 17. As holding apparatus 123 and control plate 17 continue to rotate, control plate 17 again contacts the one released flapper 121 and pushes it upward to its horizontal position.

Figure 5:
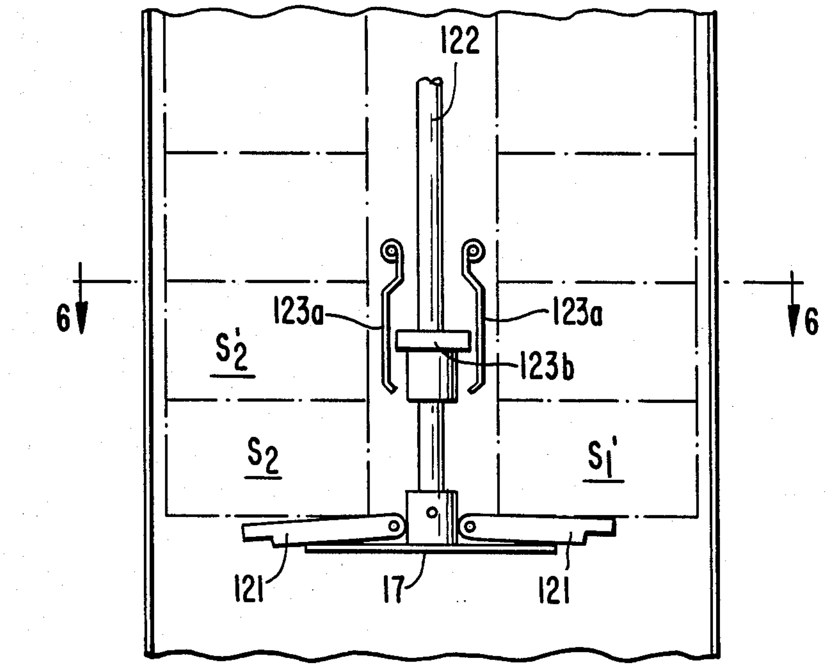
FIG. 5 is a partial front end view of the article dispensing mechanism of FIG. 1 illustrating the final operating position of the dispensing mechanism after completion of a dispensing operation.
Figure 6:
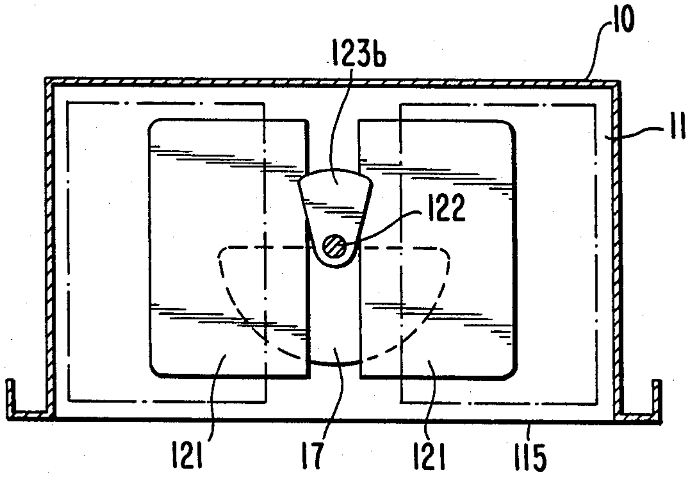
FIG. 6 is a sectional view taken along line 6—6 in FIG. 5.

After rotating shaft 122 rotates 180°, to its suport postion, motor 21 is turned off and flappers 121 and holding apparatus 123 come to rest in the position shown in FIGS. 5 and 6. At this time, article S1′ is released from between holding apparatus 123 and side plate 111 and slides down to the top surface of flapper 121. Article S2, disposed on flappers 121, is dispensed by the next operation of the dispensing mechanism in the same manner as described above in connection with article S1.

While the present invention is shown and described by reference to dispensing apparatus with two flappers such that control plate 17 has two support positions (FIG. 2 and 6) and a 90° angle between the support position and the position where one of flappers 121 is released, it will be appreciated by those skilled in the art that other arrangements are possible. As an example, the present invention could be used in dispensing apparatus with one flapper such that support plate 17 has one support position and further such that a 180° angular displacement is required before the flapper is released.

Figure 9:
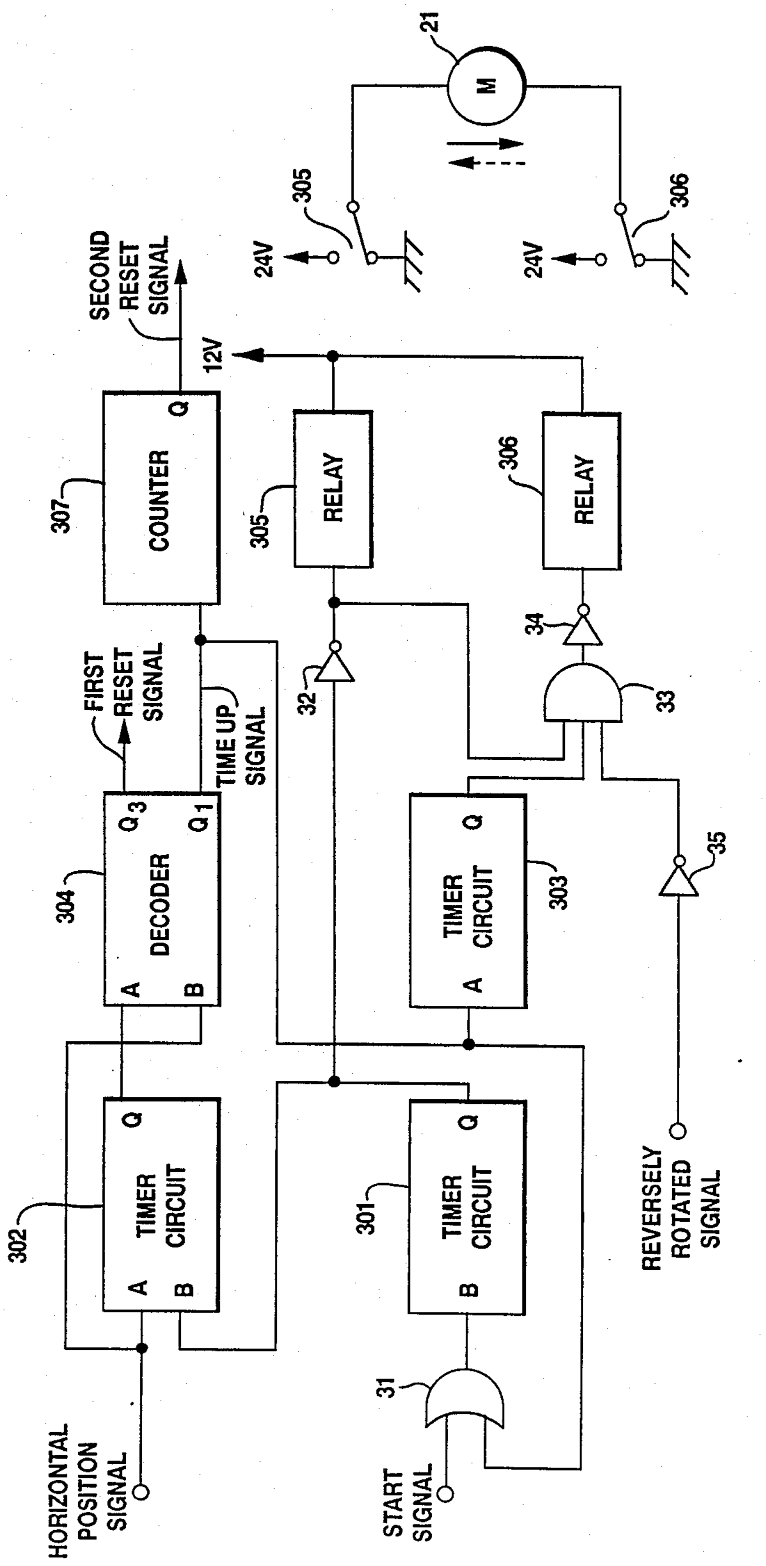
FIG. 9 is a circuit diagram of the motor control device according to one embodiment of this invention.

Referring to FIG. 9, a control device for motor 21 is shown. The control device comprises three timer circuits 301, 302 and 303, a decoder 304 and two relay devices 305 and 306. Motor 21 is coupled to the controlled output of both relay devices 305 and 306. The controlled output of each relay device 305 and 306 is normally connected to a terminal which is grounded. The switch of each relay is controlled by a logic LO level signal to connect its controlled output to a 24V power source. Therefore, motor 21 is driven by the switching operation of relay devices 305 and 306.

A dispense request signal from a vending switch, such as a start signal, is coupled to one of the input terminals of OR gate 31. The "Q" output terminal of timer circuit 301 is connected to the "B" input terminal of timer circuit 302. The output of timer circuit 301 is also connected to relay device 305, via an inverter 32,such that the inverted signal from timer circuit 301 is supplied to relay device 305.

A horizontal position signal, indicating that flappers 121 are in a horizontal position, is supplied to input terminal "A" of timer circuit 302. The "Q" output terminal of timer circuit 302 is connected to the "A" input terminal of decoder 304. The "B" input terminal of decoder 304 is connected to the "A" input terminal of timer circuit 302, i.e., the horizontal position signal from flappers 121 is also connected to the "B" input terminal of decoder 304. The "$Q_1$" output terminal of decoder 304 is connected to the other input terminal of OR gate 31 and is also connected to the "A" input terminal of timer circuit 303.

The "Q" output terminal of timer circuit 303 is connected to one of the input terminals of AND gate 33. The inverted signal from the "Q" terminal of timer circuit 301 is also coupled to the input of AND gate 33. Furthermore, a reversely rotating signal of rotating shaft 122, which indicates that rotating shaft 122 has rotated a predetermined angle in the reverse direction, is also input to AND gate 33. The output signal from AND gate 33 is supplied to relay device 306 through inverter 34 to control the reverse rotation of motor 21.

Each timer circuit 301, 302 and 303 operates in a similar manner. Particularly, an active or H1 level signal is provided at the "Q" output terminal of the timer device when:

(a) a LO level signal is present at its "A" input terminal and the signal present at its "B" input terminal undergoes a HI to LO transition; or (b) a HI level signal is present at its "B" input terminal and the signal present at its "A" input terminal undergoes a LO to HI transition.

It will be appreciated by those skilled in the art that the "A" input terminal of timer circuit 301 and the "B" input terminal of timer circuit 303 are permanently at logic LO and HI levels, respectively, such that the output of these circuits is dependent only on the transition of the inputs shown. The output of each timer circuit is normally at a logic low level and becomes active for a predetermined time interval, as will be described more fully below. While an active timer circuit output is described herein as a logic HI level, it will be appreciated by those skilled in the art that an active output could be a logic LO level in other similar circuits. Each timer circuit 301, 302 and 303 can be readily provided by those skilled in the art using conventional logic devices.

Decoder circuit 304 is provided for supplying a known output set "$Q_1$" and "$Q_3$" in response to specific input set "A" and "B". A truth table for decoder circuit 304 is provided in FIG. 11 and will be discussed more fully below. Decoder 11, like timer circuits 301, 302 and 303, can be readily provided by those skilled in the art using conventional devices. Other devices shown in FIG. 9, i.e., OR gate 31, AND gate 33, inverters 32, 34 and 35, and counter 307 are conventional devices for providing the named functions.

The operation of the control device illustrated in FIG. 9 will be explained with reference to FIGS.9 and 10. When the start signal (dispense request) is received from the vending switch in the form of a logic HI to LO transition and supplied to an input terminal of OR gate 31, a corresponding signal is supplied to input terminal "B" of timer circuit 301. Therefore, the "Q" terminal of timer circuit 301 becomes active, i.e., rises a logic HI level, for a predetermined time period following the occurrence of the start signal. In this embodiment, the predetermined time period for which the output of timer circuit 301 is active is chosen to equal 6 seconds. The logic HI level output from timer circuit 301 is inverted to a logic LO level signal by inverter 32 and supplied to relay device 305. As a result, the lever of relay device 305 is moved into contact with the terminal connected to the 24V power source to cause the positive current to flow through motor 21 as shown by the solid arrow in FIG. 9. Thus, motor 21 is driven in the normal forward direction to provide forward rotation to rotating shaft 122. The output of timer circuit 301 is, therefore, referred to as a forward rotation signal.

As motor 21 begins to drive rotating shaft 122, the horizontal position signal, supplied to the "A" input terminal of timer circuit 302, changes from a logic HI to a logic LO level. In normal operation, rotating shaft 122 rotates 180° within 6 seconds from the occurrence of the start signal. When rotating shaft 122 is rotated 180°, the flapper moves to its horizontal position and the horizontal position signal changes to a logic HI from a logic LO level. If this occurs within six seconds, i.e., while the "Q" output of timer circuit 301 is still at a logic HI level, then a logic HI level signal is output from the "Q" output terminal of timer circuit 302 to the "A" input terminal of decoder 304. The "B" input terminal of decoder 304 receives the HI level horizontal position signal and, therefore, the "$Q_3$" output terminal of decoder 304 provides a logic HI level signal which is referred to as the first reset signal (FIG. 11). The first reset signal indicates that the vending cycle for discharging the article is completed and resets the dispensing mechanism for the next operation.

During the operation of the dispensing mechanism, if an article becomes stuck between one of the flappers and the side wall of the storage area the rotation of motor 21 is stopped and rotating shaft 122 cannot provide the horizontal position signal within the required 6 seconds, i.e., the logic HI level signal from the "Q" output terminal of timer circuit 301 changes to a logic LO level before the horizontal position signal changes to a HI level. Therefore, a logic LO level signal is supplied to the "A" input terminal of timer circuit 32 during the HI to LO transition at its "B" input and, hence, a logic HI level is output from the "Q" output terminal of timer circuit 302.

Figure 7:
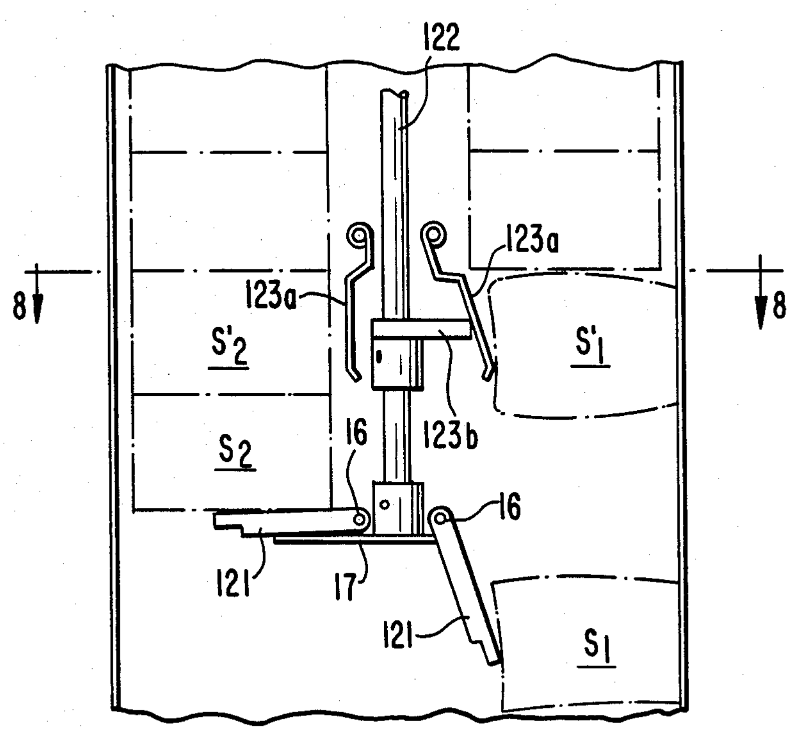
FIG. 7 is a partial front end view of the article dispensing mechanism of FIG. 1 illustrating a stuck condition.
Figure 8:
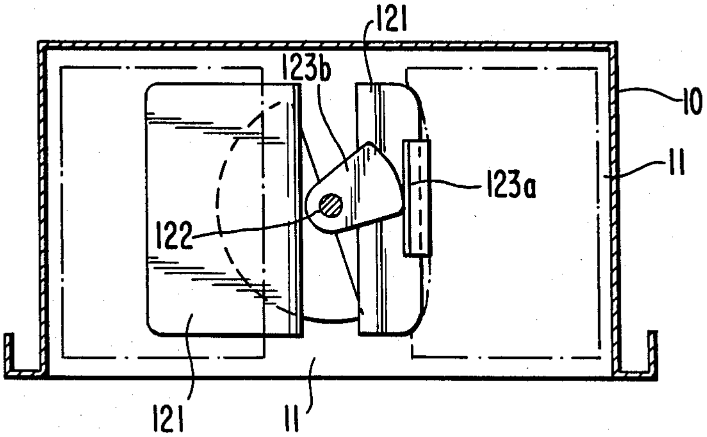
FIG. 8 is a sectional view taken along line 8—8 in FIG. 7.
Figures 10, 11:
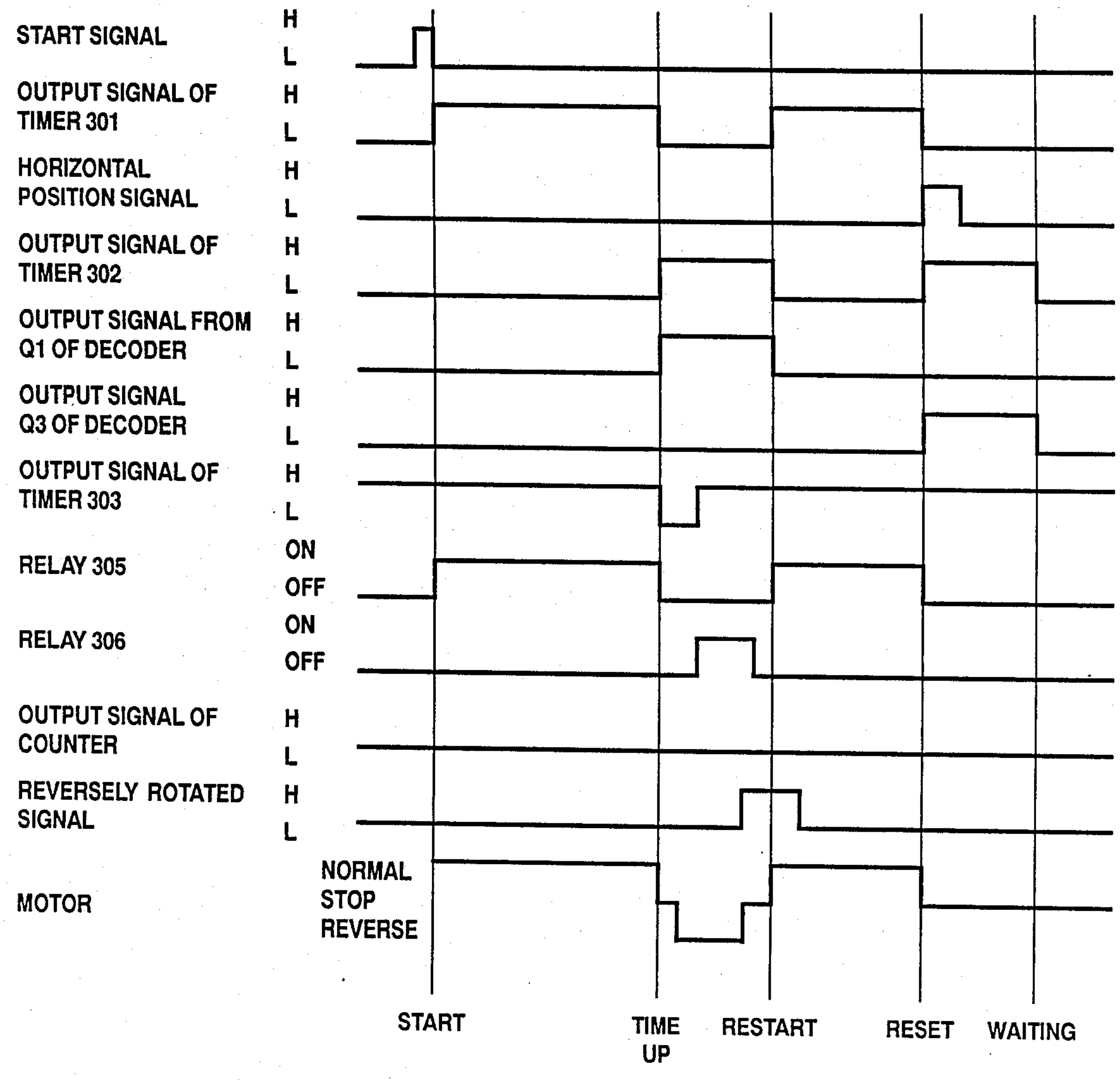
FIG. 10 is a time-line chart illustrating various logic signals in the motor control device of FIG. 9.
FIG. 11 is a truth table for the decoder illustrated in FIG. 9.

When a logic LO level signal is provided to the "B" input terminal of decoder 304 and a logic HI level signal is provided to its "A" input terminal, then a logic LO level signal is provided at the "$Q_3$" output and a logic HI level signal is provided at the "$Q_1$" output terminal (FIG. 11). The "$Q_3$" output is referred to as the time up signal and is active for a predetermined time period, as determined by the active period of timer circuit 302, which time period is chosen to equal four seconds in the present embodiment. This time up signal is supplied to timer circuit 303 and OR gate 31. When the time up signal becomes active, the "Q" output terminal of timer circuit 303 becomes active, i.e., provides a logic HI level signal, for a predetermined time period. The active interval for timer circuit 303 is also chosen to equal four seconds. At this time, all input terminals of AND gate 33 are maintained at at logic HI level, and, therefore, AND gate outputs a logic HI level signal. This logic HI level signal is inverted to LO level signal by inverter 34 and then is supplied to relay device 306. Therefore, the lever of relay device 306 is moved into contact with the terminal connected to the 24V power source to cause negative current to flow through motor 21, as shown by the dotted arrow in FIG. 9. Motor 21 is therefore reversely rotated, i.e., the flapper on which the article is stuck is freed from the restriction of control plate 17. As a result of this condition, the discharge opening of the dispensing mechanism is cleared (FIG. 7). The signal supplied by AND gate 33 is, therefore, referred to as the reverse rotation signal.

If rotating shaft 122 reversely rotates 90° from the normal waiting position, the reversely rotated signal, which is supplied to AND gate 33 through inverter 35, is changed from a logic LO level to logic HI level. Then the output of AND gate 33 is changed to logic LO level signal from logic HI level and, the rotating motion of motor 21 is ceased.

After the predetermined time period for the time up signal has elapsed, the output signal from the"$Q_1$" terminal of decoder 304 is changed to a logic LO level. Thus, the "A" input to timer circuit 301 undergoes a HI to LO transition and the "Q" output terminal of timer circuit 301 becomes active, i.e., transitions to a logic HI level, as described above. When the "Q" terminal of timer circuit 301 against becomes active, the control device for the dispensing mechanism is operated in the normal manner, i.e., the stuck article is released from the flapper and discharged due to the above operation. Rotating shaft 122 is rotated to the support position within 6 seconds, the horizontal position signal changes to a logic HI from a logic LO level, and the mechanism is reset by decoder 304. So, one cycle for dispensing the article is completed.

If the article stuck between the flapper and the side wall of the storage space is not released from the storage area by one cycle of the above mentioned operation, the reverse rotation of motor 21 is continuously repeated until the article is freed. However, this operation is repeated a predetermined number of times and, if the stuck condition of the article is not resolved, the control device is reset such that operation of the dispensing mechanism is terminated and the occurrence of trouble is indicated. To accomplish this, the time up signal output from the "$Q_1$" terminal of decoder 304 is input to a counter 307, as shown in FIG. 9. If counter 307 receives a predetermined number of time up signals before the first reset signal is activated, the "Q" output terminal of counter 307 is activated and the dispensing mechanism is reset and the occurrence of trouble is indicated.

As mentioned above, if a hanging or stuck condition is detected, the motor control device temporarily stops the operation of the motor and then reversely drives the motor to clear the discharge opening by freeing one of the flappers from restriction by the control plate. Therefore, even if the dispensing article is stuck between the flapper and the side wall of the article storage area, the article has a chance to release itself. Also, the operation of the motor is totally ceased and the trouble of the dispensing mechanism is indicated after rotation of the motor has been reversed several times.

Figure 12:
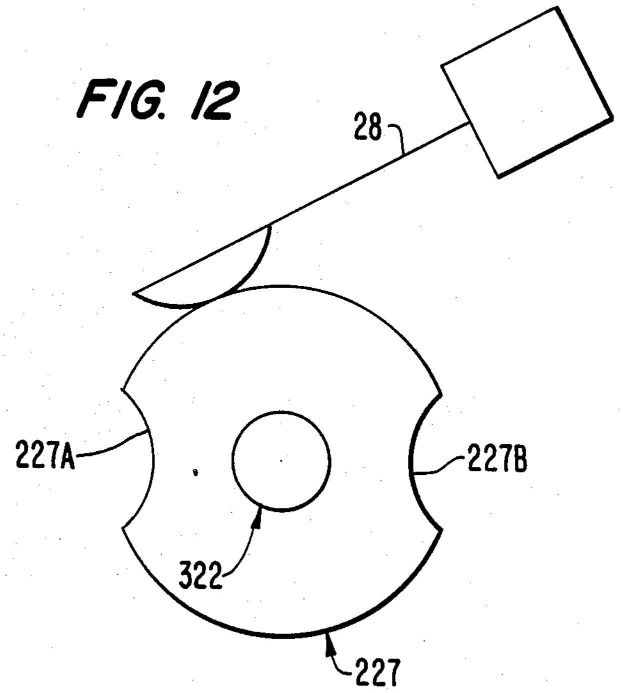
FIG. 12 illustrates a cam-shaft arrangement which may be used to control a motor.

A single cam shaft arrangement for controlling the operation of a motor is generally illustrated in FIG. 12. A notched cam 227 is coupled to a shaft 322 and cooperates with a switch element 28 to control the motor. Cam portion 227 has two equiangular spaced cut-out portions 227*a* and 227*b* at its outer peripheral surface. Switch element 28 is disposed adjacent the outer peripheral surface of cam portion 227 and moves in correspondence with the cam's configuration. Therefore, operation of switch element 28 is controlled by rotation of cam portion 227. In the embodiment of FIG. 12, cut-out portions 227*a* and 227*b* are formed at an angular offset of 180° so that the motor stops after rotatable shaft 322 rotates 180°. Those skilled in the art will appreciate that cut-out portions may be formed at various angular offsets so that the motor stops after rotatable shaft 322 rotates through various predetermined angles, the predetermined angles being determined by the positioning of the cut-out portions on the cam. In short, by forming the cut-out portions of cam 227 at some predetermined angular offset, one is able to detect when rotatable shaft 322 has rotated through a predetermined angle and control the motor accordingly.

Figure 13:
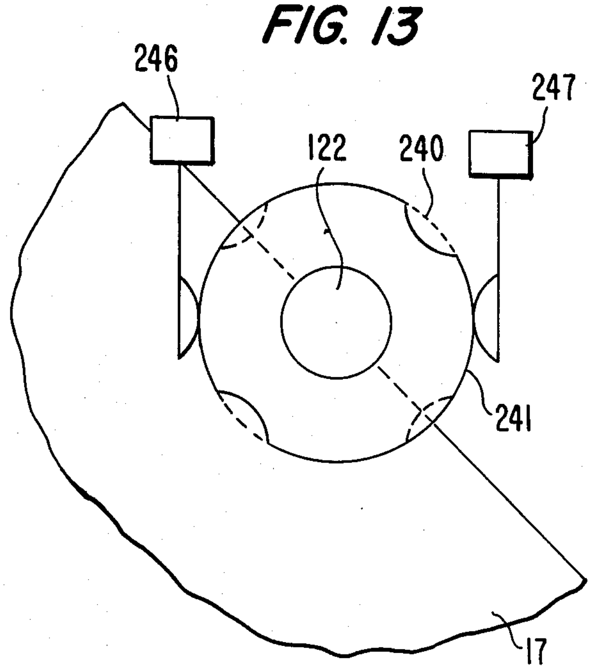
FIG. 13 illustrates cam-shaft arrangements which may be used in the present invention taken along a view similar to that of FIG. 8.

The horizontal position signal is provided by a first cam-shaft arrangement and the reversely rotated signal by a second cam-shaft arrangement. FIG. 13 illustrates such a configuration which may be used with the present invention. Notched cams 240 (shown in phantom) and 241 are respectively coupled to shaft 122. Switch element 246 is associated with notched cam 240 and switch element 247 is associated with notched cam 241. Notched cams 240 and 241 each contain cut-out portions formed at an angular offset of 180°. Notched cam 240 provides the horizontal position signal and notched cam 241 provides the reversely rotated signal. In normal operation, rotating shaft 122 rotates 180° within 6 seconds from the occurrence of the start signal. When rotating shaft 122 rotates 180° within 6 seconds, switch element 246 becomes disposed in one of the cut-out portions of notched cam 240 so that motor 21 stops and the horizontal position signal changes to a logic HI level from a logic LO level. This generates a first reset signal indicating that the vending cycle for discharging the article is completed and resets the dispensing mechanism for the next operation.

As noted above, if, during the operation of the dispensing mechanism, the rotating shaft does not rotate 180° within 6 seconds, the time-up signal becomes active for a predetermined time period of 4 seconds. Motor 21 is reversely rotated and the flapper on which an article may be stuck is freed from the restriction of control plate 17. If rotating shaft 122 reversely rotates 90° from the normal waiting position, i.e., switch element 247 becomes disposed in one of the cut-out portions of cam 241, the reversely rotated signal is changed from a logic LO level to a logic HI level and the rotating motion of motor 21 is stopped. After the four second predetermined time period for the time up signal has elapsed, the dispensing mechanism is operated in the normal manner. If rotating shaft 122 is rotated to the support position within 6 seconds, i.e., switch element 246 becomes disposed within a cut-out portion of cam 240 within 6 seconds, the horizontal position signal changes to a logic HI from a logic LO level and the mechanism is reset by decoder 304. If the shaft again fails to complete its 180° rotation within the 6 second period, the reverse rotation of motor 21 followed by forward rotation is repeated a predetermined number of times. Other arrangements for indicating the position of shaft 122 will readily come to mind and can be used herein to the same extent as the cam-switch arrangements described above.

It will be appreciated by those skilled in the art that the first reset signal and the second reset signal are used to temporarily inhibit the rotation of motor 21. This even though the forward rotation signal may still be active. In the case of the first reset signal, operation of motor 21 will be again enabled after the four second, first reset signal becomes inactive. It will be further appreciated by those skilled in the art that the first reset signal is used to clear, or reset counter 307.

This invention has been described in detail in connection with the preferred embodiment. This embodiment is merely for example only and this invention is not restricted thereto. It will be easily understood by those skilled in the art that other variations and modifications can be easily made within scope of this invention, as defined by the appended claims.

We claim:

1. In a dispensing mechanism for vending machines including an article storage area in which the articles are stored in a stacked dispostion above a bottom opening through which the lower most articles are dispensed and a dispensing mechanism to dispense the lowermost articles stacked in said storage area through said bottom opening, said dispensing mechanism including a rotating shaft extending within said storage area, a flapper pivotably supported within said storage area adjacent to said rotating shaft and control plate means fixed on said rotating shaft in contact with said flapper for controlling the pivoting of said flapper upon rotating of said rotating shaft to selectively open and close said flapper to dispense the lowermost stacked articles, the improvement comprising:

motor means, for rotating said shaft, said motor means being responsive to an active forward rotation signal to rotate said shaft in a forward direction and said motor means being responsive to an active reverse rotation signal to rotate said shaft in a reverse direction;

first timer means for providing the forward rotation signal, said first timer means being responsive to a dispense request for activating the forward rotation signal for a predetermined time period; and second timer means for providing the reverse rotation signal, said second timer means being responsive to the forward rotation signal and the rotation of the shaft through a predetermined angle within said predetermined time period and, if said shaft fails to rotate through the predetermined angle within said predetermined time period, for activating the reverse rotation signal.

2. The dispensing mechanism of claim 1 wherein said second timer means is further responsive to the position of said shaft for terminating the reverse rotation signal.

3. The dispensing mechanism of claim 1 wherein said second timer means is further adapted to provide a time up signal and to activate the time up signal upon determining that said shaft has failed to rotate through the predetermined angle within said predetermined time period, said first timer means being further responsive to the time up signal for providing the forward rotation signal.

4. The dispensing mechanism of claim 3 wherein said second timer means further comprises means for counting the number of times the time up signal is activated, said counting means being adapted to provide a reset signal after counting a predetermined number of pulses, said dispensing mechanism being responsive to the reset signal for discontinuing its operation.

5. Apparatus for controlling the dispense operation of a dispense mechanism in response to a dispense request, the dispense mechanism including a rotating shaft, a flapper for dispensing goods which are stacked upon the flapper, the flapper being supported in a horizontal position by a control plate coupled to the rotating shaft when the control plate is in a support position such that goods are not dispensed and the flapper being free to pivot when the control plate is displaced a first predetermined angle from the support position such that goods may be dispensed, said apparatus comprising:

motor means for rotating the control plate, said motor means being responsive to an active forward rotation signal for rotating the control plate in a forward direction and said motor means being responsive to an active reverse rotation signal for rotating the control plate in a reverse direction;

first timer means responsive to the dispense request for activating the forward rotation signal;

first sensor means for indicating when the shaft has rotated through a second predetermined angle; and second timer means responsive to said first sensor means and the forward rotation signal for activating the reverse rotation signal if the shaft fails to rotate through the second predetermined angle in a predetermined time period while the forward rotation signal is active.

6. Apparatus as recited in claim 5 further comprising second sensor means for indicating when the control plate is rotated the first predetermined angle from the support position, said second timer means being further responsive to said second sensor means for inactivating the reverse rotation signal.

7. Apparatus as recited in claim 6 wherein said second timer means is further adapted to provide a time up signal, said second timer means being adapted to activate said time up signal upon determining that the shaft has failed to rotate through said second predetermined angle in a predetermined time period while the forward rotation is active, said first timer means being further responsive to the time up signal for activating the forward rotation signal.

8. Apparatus as recited in claim 5 wherein said first sensor means comprises a first cam portion coupled to said shaft, said first cam portion including a plurality of cut-out portions disposed around its periphery at angular offsets corresponding to said second predetermined angle.

9. Apparatus as recited in claim 6 wherein said second sensor means comprises a second cam portion coupled to said shaft, said second cam portion including a plurality of cut-out portions disposed around its periphery at angular offsets corresponding to said first predetermined angle.

10. A method for dispensing goods from a dispense mechanism is response to a dispense request, said dispense mechanism including a rotating shaft, a flapper for dispensing goods which are stacked upon the flapper, the flapper being supported in a horizontal position by a control plate coupled to the rotating shaft when the control plate is in a support position such that goods are not dispensed, said flapper being free to pivot when the control plate is displaced a first predetermined angle from the support position such that goods may be dispensed, the method comprising the steps of:

(a) waiting to receive a dispense request and, thereafter, performing step b:

(b) rotating the control plate in a forward direction;

(c) monitoring the position of the shaft while the control plate is being rotated to determine whether the shaft rotates through a second predetermined angle within a predetermined time interval and, if so, discontinuing rotation of the control plate, terminating the dispense operation and repeating step a and, if not, performing step d; and (d) rotating the control plate in a reverse direction until the control plate is displaced the first predetermined angle from the support position and, thereafter, repeating step (b).

11. The method as recited in claim 10 wherein the step of rotating the control plate in a reverse direction comprises the substeps of:

(f) rotating the control plate in a reverse direction until the control plate is displaced the first predetermined angle from the support position and performing step g;

(g) incrementing a count variable by 1 and determining whether the count variable is greater than a predetermined number and, if not, repeating step (b) and, if so, discontinuing operation of the dispense mechanism.

* * * * *